T. M. FLENNIKEN.
GRAIN BINDER.
No. 367,285. Patented July 26, 1887.
5 Sheets—Sheet 1.
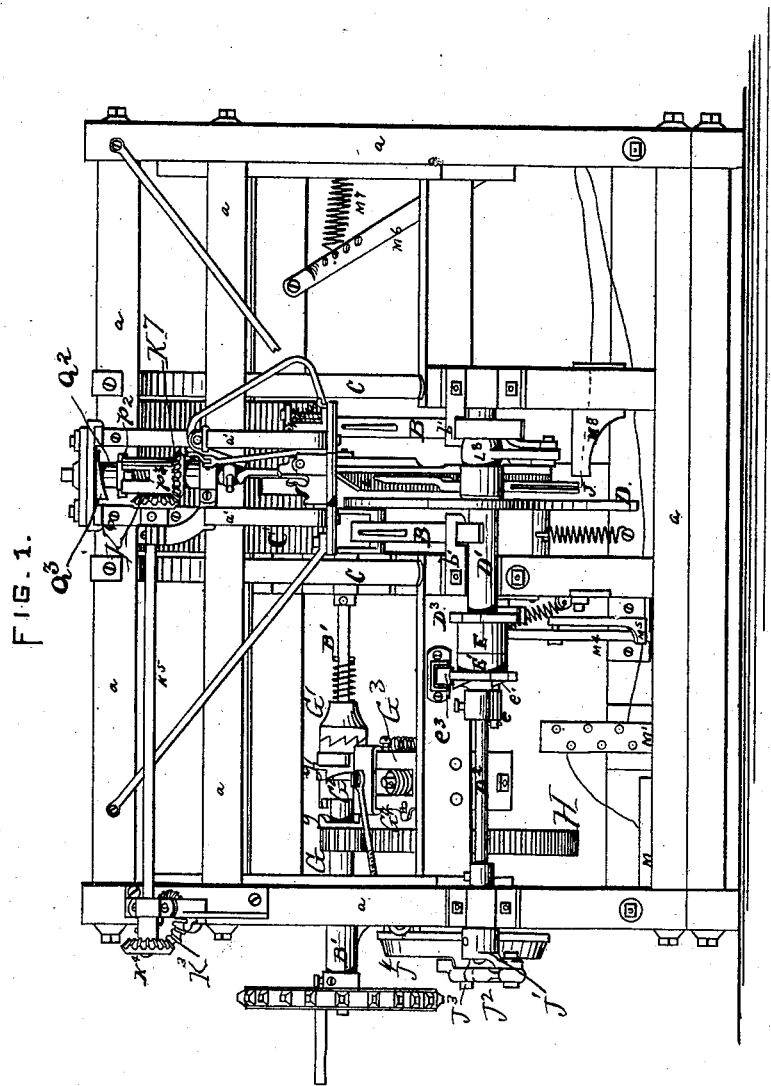
Witnesses:
F. B. Townsend
Forde R. Smith
Inventor:
Theodore M. Flenniken
by Munday & Evarts
his attys.

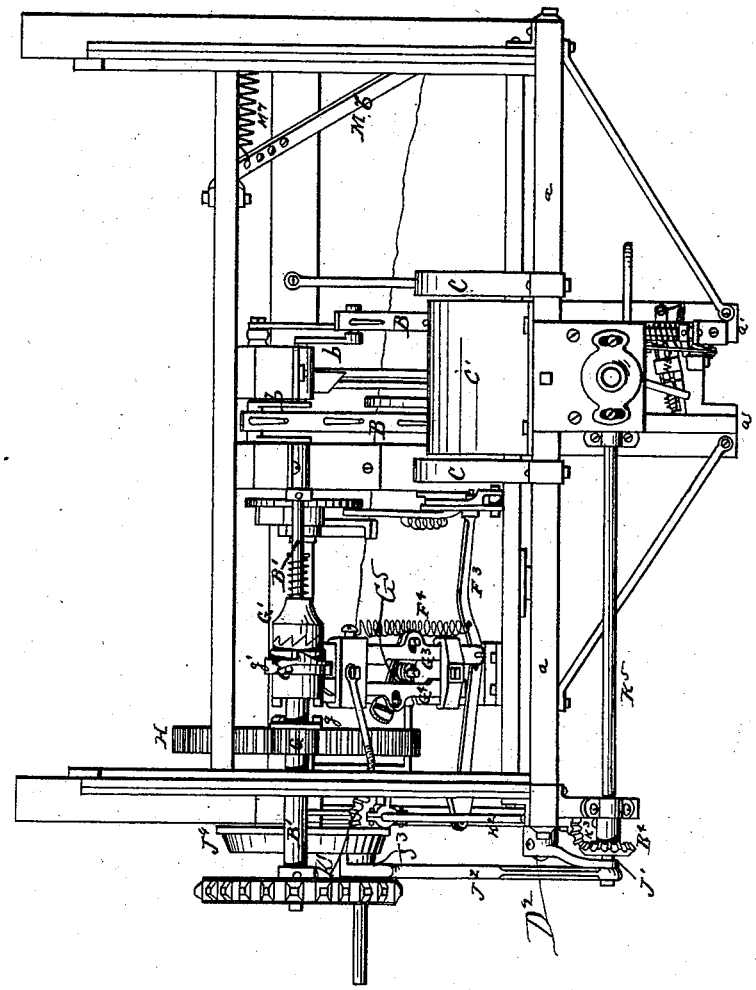

T. M. FLENNIKEN.
GRAIN BINDER.

No. 367,285. Patented July 26, 1887.

Witnesses:
F. B. Townsend
Forde R. Smith

Inventor:
Theodore M. Flenniken
by Munday & Evarts
his attys

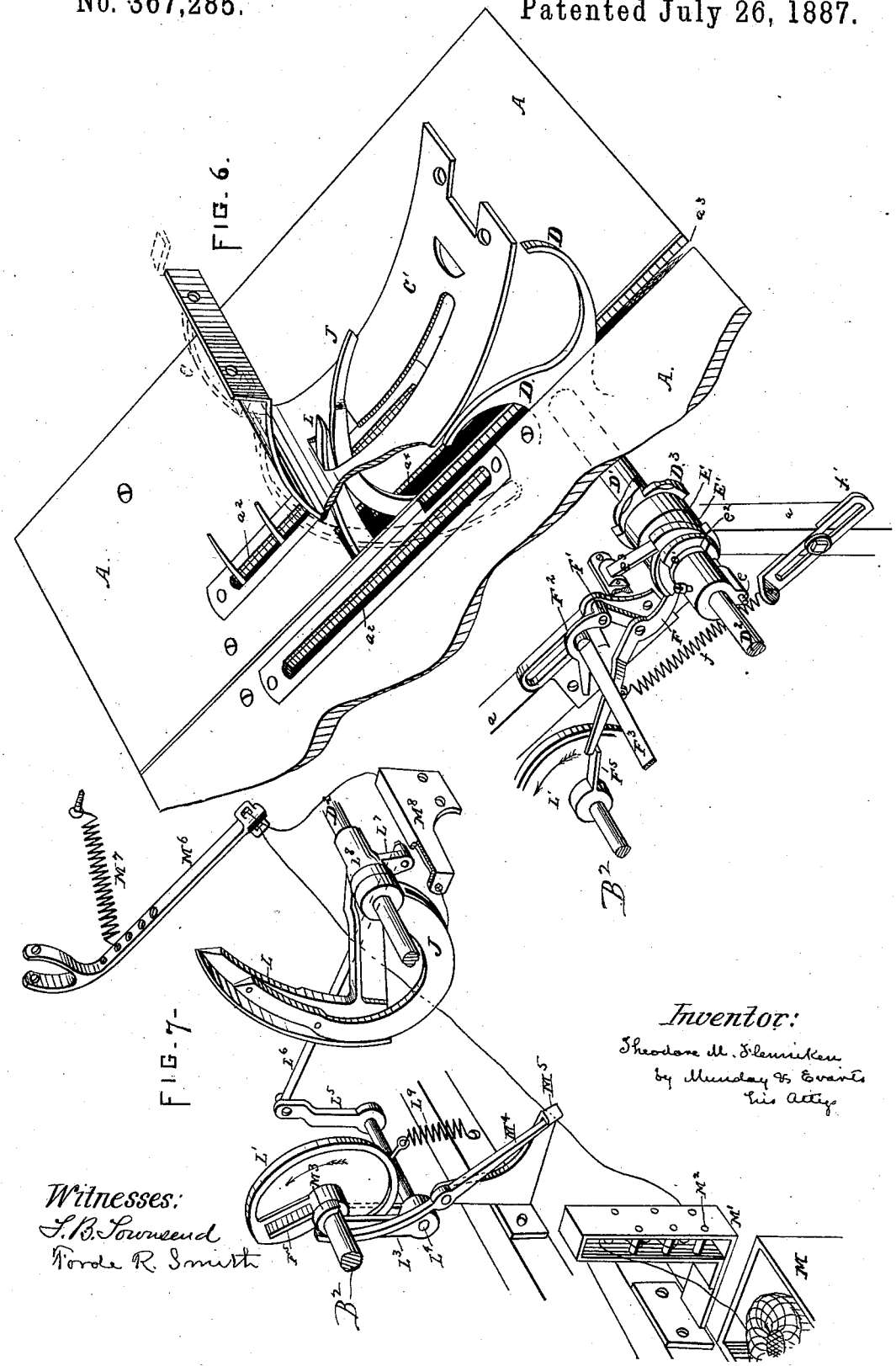

T. M. FLENNIKEN.
GRAIN BINDER.
No. 367,285. Patented July 26, 1887.
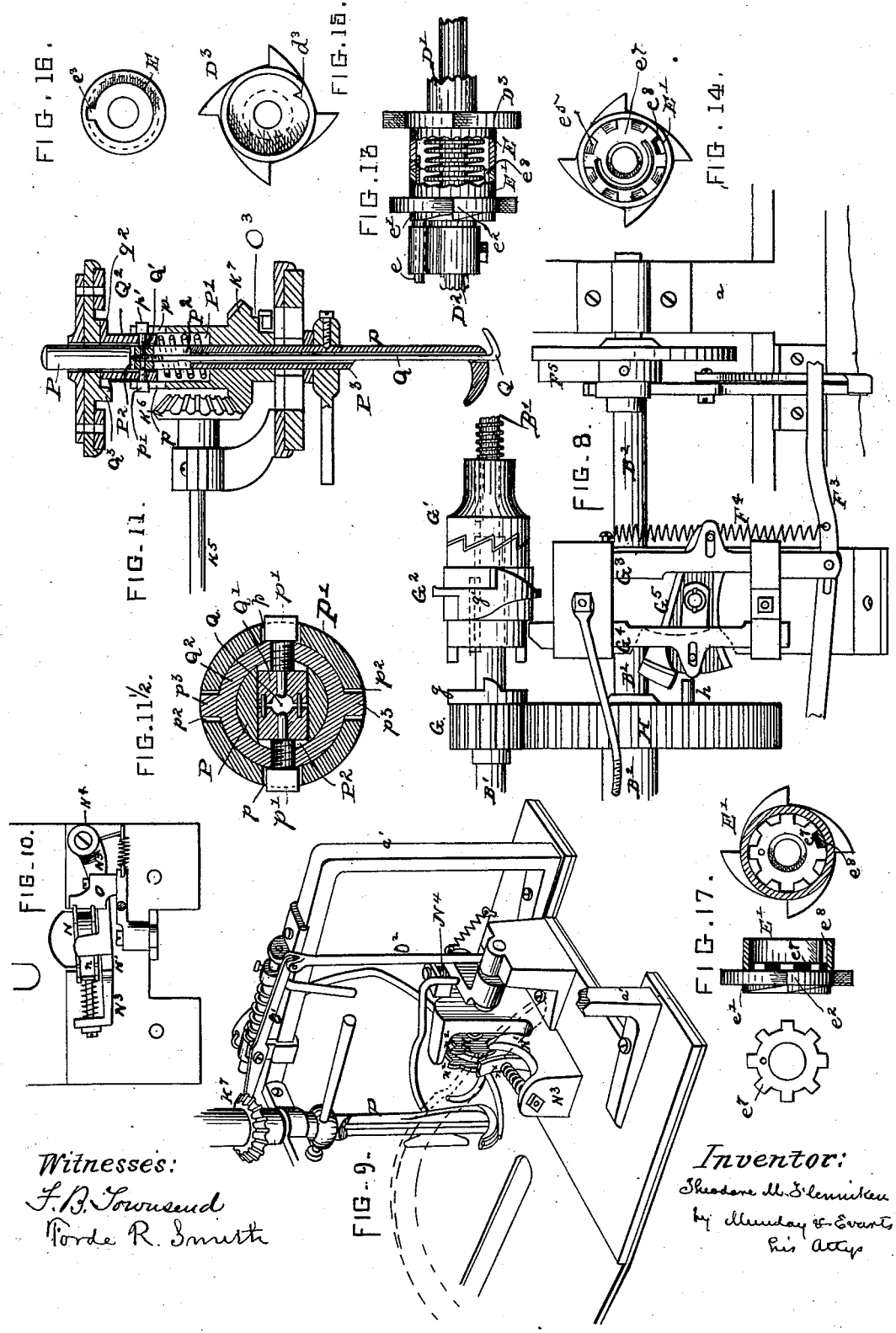

UNITED STATES PATENT OFFICE.

THEODORE M. FLENNIKEN, OF ROCKFORD, ILLINOIS, ASSIGNOR TO N. C. THOMPSON, OF SAME PLACE.

GRAIN-BINDER.

SPECIFICATION forming part of Letters Patent No. 367,285, dated July 26, 1887.

Application filed December 17, 1877.

*To all whom it may concern:*

Be it known that I, THEODORE M. FLENNIKEN, of Rockford, in the county of Winnebago and State of Illinois, have invented certain new and useful Improvements in Grain-Binding Mechanism for Harvesters, of which the following is a description, reference being had to the accompanying drawings, which form a part of this specification, and in which—

Figure 4:
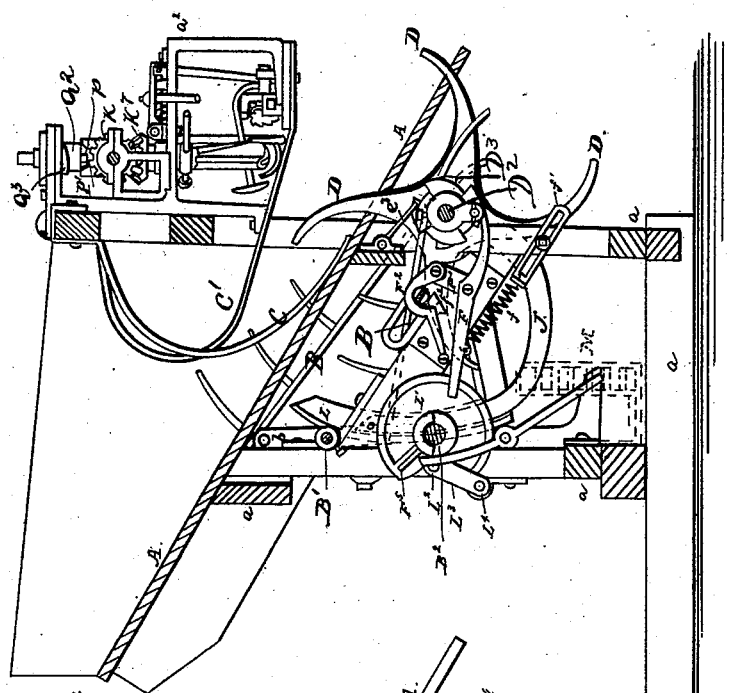
Figure 3:
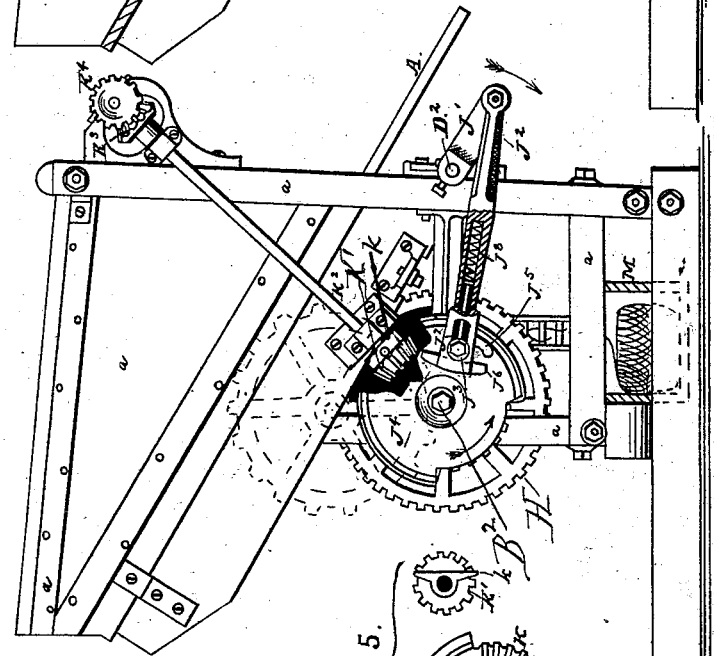
Figures 5, 12:
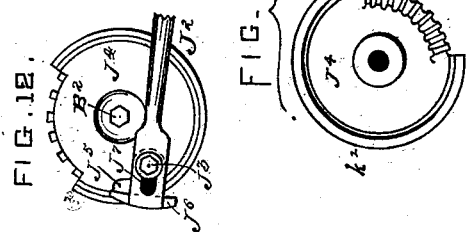

Figure 1 is a side elevation with the platform removed. Fig. 2 is a plan or top view of the same. Fig. 3 is an end view. Fig. 4 is a cross-section. Fig. 5 is a detached view of a wheel and pinion. Fig. 6 is a perspective view of a portion of the platform and some of the operating parts. Fig. 7 is a perspective view of a portion of the machinery. Fig. 8 is a plan view of the clutch and the automatic shipping device. Fig. 9 is a perspective view of the knot-tying apparatus. Fig. 10 is a plan of the swinging cord-holder. Fig. 11 is a vertical longitudinal section of the cord-knotter. Fig. $11\frac{1}{2}$ is a transverse section, on an enlarged scale, of the tying-hook shaft, needle-operating sleeve, and the sleeve-extension of the gear-wheel fixed on the tying-hook. Fig. 12 is a detail view, partly in section, of matter shown in Fig. 3, the position of the parts being that in which the curved plate on the pitman rides upon that fixed to the wheel to produce a pause of the cord-arm shaft. Fig. 13 is a sectional side elevation of the drums and inclosed spring on the cord-arm shaft. Figs. 14, 15, and 16 represent interior parts of the construction shown in Fig. 13; and Fig. 17 represents in plan view a notched plate, also a section of the barrel or drum E′, and also another section of the same with a projection on the interior of the drum entering a notch in the plate.

Like letters of reference made use of in the several figures indicate like parts wherever employed.

In the said drawings, A represents an inclined platform, upon which the grain is fed from the harvester-elevator. This platform A is supported in a suitable frame-work, $a$, which carries also a supplementary frame, $a'$, supporting the knot-tying mechanism, located above the lower or outer end of the inclined platform. This arrangement of the platform and knot-tying mechanism in the shape of a triangle brings all the parts into compact form, and leaves plenty of room for all, as well as a free clear grain-space on the platform. The platform is provided with slots $a^2 a^2$ and $a^3 a^4$. The two former serve to permit the rakes to rise to seize and convey the grain. The slot $a^3$ is to allow the arms of the bundle-receiver to turn through the platform and the slot $a^4$ for the passage of the cord-arm and its sheath.

The pair of rakes consist of bars B, provided with teeth projecting upward from their faces. These rakes work alternately by being connected at their upper or inner ends to cranks $b$ on a shaft, B′, and at their lower or outer ends they slide through ways or guides $b'$. By attaching the cranks to the upper or inner ends of the rakes I give them the greatest motion at the point where they first engage the straw, where the straw is loose, and a gradually-decreasing motion as the straw descends and becomes compacted. The advantage of this construction will be obvious to all familiar with the art.

The crank-shaft B′, to which the rakes are attached, is a continuation of the main or driving shaft, to which it is connected by a clutch, so that when the clutch is in gear the motion is direct from the driving-pulley to the rakes; and the mechanism is so contrived, as will be presently explained, that when the rake-operating shaft is in gear, all the other parts of the mechanism are out of gear, so that the driving-pulley has only the raking work to do until the bundle is gathered and ready to be tied.

In order that the straw may be sure to pass evenly and regularly to the binding mechanism, I provide a pair of guides or regulators, C C, one at each side of the rakes. These may consist of any suitable contrivance for pressing the straw with a yielding pressure at the two points indicated; but I prefer to use the springs shown, which are secured to the frame-work above and curve down until they rest upon the platform at each side of the outer portions of the rakes. The straw carried down by the rakes strikes these guides and raises them and passes beneath them, being thus straightened and caused to pass evenly and truly to the binding device. Near these guides is the curved sheet-metal fender C', slotted for the passage of the cord-arm and serving to keep the straw away from the knot-tying mechanism, and also serving to hold the grain down on the feeding-rakes. This fender is secured to the frame-pieces of the machine above the knot-tying mechanism and is curved out inward over the platform and recurved back to the frame below the knot-tyer, thus avoiding the necessity of a supporting-beam over the platform other than the frame-work shown. Just outside of the guides C C is located the receiver and bundle-sizing device, which consists, preferably, of a series of four arms, D, properly curved to receive the bundle. These arms extend from a central hub, which is carried by a sleeve, D', slipped over the rock-shaft $D^2$, which, it may be remarked, is the shaft that actuates the cord-arm.

When the rakes are forcing the grain along, one of the arms D stands ready to receive it, and as the grain is pressed against it the arm gradually yields under the pressure until it passes a certain point, at which time it becomes rigid, to serve as a fixed side, in order that the bundle may be compressed by the cord-arm. After which, and after a sufficient pause for the tying operation, the said receiver becomes loose, to permit the bundle to fall out by its own weight, by the further rotation of the receiver, and thus to become set again for a new bundle. These various conditions and movements of the receiver are produced as follows: At the end of the sleeve D', which carries the receiver, is a ratchet-disk, $D^3$, with teeth corresponding in number to the arms of the receiver. The face of this ratchet-disk farthest from the receiver is hollowed out or formed with a cavity, which is provided with a stop, $d^3$, at one point. Adjoining this ratchet-disk, and also slipped upon the shaft $D^2$, is a barrel consisting of two parts, E E'. The part E immediately next the ratchet-disk $D^3$ has a projection, $e^i$, that engages the stop just mentioned, so that the barrel may have a motion to the extent of nearly a revolution that will be independent of the ratchet-disk $D^3$ and receiver. The other part, E', of the barrel is connected to the shaft by a pawl, $e$, working against crown ratchet-teeth $e'$; and this part of the barrel is also furnished with ratchet-teeth $e^2$, engaged by a pawl, $e^3$, from the frame of the machine to prevent it from being thrown back. Within the barrel is a coiled spring connected at one end to the part E and the other end to the part E' of the barrel through the medium of notched plate $e^7$. The notched plate or disk $e^7$ is made to engage the drum E' by means of a projection, $e^8$, on the latter entering a notch in the periphery of the plate, and this means of connection enables the tension of the spring to be adjusted. As the other end of the spring is fastened to the drum E, it is obvious that when the ratchet-disk $D^3$ and the receiver under the pressure of the accumulating grain is arrested by the stop, the end of the spring in the drum E will also be held; but the other end of this spring coiled about shaft $D^2$ and connected to drum E' would be wound by the revolution of the shaft $D^2$ during the movement of the cord-arm around the bundle. When the ratchet-disk $D^3$ and its connecting-drum E are released by the tripping of the pawl F, the spring above described will aid in discharging the bundle by revolving the drum, disk, and receiver.

In a position to engage the teeth of the ratchet-disk $D^3$, as shown in Fig. 4, is a pawl-lever, F, pivoted to a lever-arm, F', which latter has a hook, $F^2$, at one end to engage and hold the end of a spring arm or lever, $F^3$, which latter is the lever that operates the clutch for throwing the main driving-shaft into and out of gear with the mechanism for operating the cord-arm and the knot-tyer, all of which will presently be explained. This pawl-lever F has connected to it one end of a spring, $f$, the other end being secured to a slotted bar, $f'$, which is attached to the outer timbers of the frame-work by a bolt and nut, so that the tension of the spring may be adjusted. When the arm of the receiver is pressed back by the grain, the ratchet-disk $D^3$ being in engagement with the pawl-lever F, will press said lever back against the tension of the spring until the arm F' has swung far enough to disengage the hook $F^2$ from the end of the spring arm or lever $F^3$, and this lever $F^3$, moved by its spring $F^4$, sets the clutch upon the main shaft in operation, so that the mechanism for operating the cord-arm, its sheath, and the tying apparatus are put in motion; but in the meantime it will be seen that the spring $f$, attached to the pawl-lever F, exerts a certain resistance to the pressure of the grain against the receiver while it is being pressed back, and before it is pressed back far enough to release the hook from the pawl-lever. This resistance being made adjustable as to its force by means of the slotted bar attachment of the spring $f$ to the frame of the machine, affords a means of adjusting within moderate limits the size of the bundle by regulating the yielding resistance of the receiver.

The receiver when it has yielded to the grain far enough to throw off the hook is made rigid against further yielding, by reason of the hook-arm F' coming in contact with a fixed stop, $f^2$, where it remains during a period of rest until the cord-arm has passed around the bundle, compressing the same against the now rigid receiver, and until the knot is tied, after which a projection, $F^5$, on the shaft which operates the cord-arm sheath, or upon a cam on said shaft, strikes the end of the pawl-lever F and throws it out of engagement with its ratchet $D^3$. This releases the receiver, and the coiled spring in the barrel E E', which has been wound up by the forward revolution of the cord-arm shaft $D^2$, comes into play and throws the receiver over far enough to discharge the bundle and to set it to receive a new bundle.

A binding-strap has been secured to a rigid curved grain-receiver and connected to a cord extended around several pulleys and attached to a tripping device, which latter was held by a spring against the pull of the strap and cord, caused by the accumulating grain in the receiver, in such manner that the tripping device operated when the tension of the spring was sufficiently overcome by the accumulation of grain, and such cord has been provided with means for adjusting its length and the tension of the spring to determine the amount of straw in the bundle, as described in Patent No. 159,506, and the combination of a receiver or strap, cord, tension-spring provided with means for regulating its tension, and a tripping device is not claimed herein. The construction herein described and claimed dispenses with the strap described in the above-named patent, and makes the receiver proper of inflexible material, yet yielding to the pressure of the grain, and the tension-spring extending from the frame of the pawl lever and provided with means for adjusting its tension, acting through a ratchet-disk on the shaft which carries or supports the receiver, tends to counteract the yielding of the receiver. Said pawl-lever moves as the receiver yields and the tension of the spring is overcome, and this movement continues until the lever strikes the stop $f^2$, when it is arrested until the pawl is tripped, whereupon the receiver yields sufficiently to discharge the bundle which has been bound about the time the lever strikes the stop.

In Patent No. 22,074, granted November 16, 1858, to Wm. Grey, there is described a grain-receiving platform, which is connected with a series of levers, and through them with a movable shaft carrying a spur-wheel, the whole being combined with a spring in such manner that it opposes the action of the load on the platform and restores the latter to its normal position when the load is discharged from said platform. In Patent No. 103,673, granted May 31, 1870, to George H. Spaulding, the cut grain was carried up and under compressing-fingers extending over a horizontal table, and said fingers at their rear ends were secured to a rotatable shaft. In operation the fingers were raised by the grain forced beneath them and above the horizontal table, by which means the shaft was turned to bring into operation, through intermediate mechanism, certain discharging-fingers that swept the grain off from the table.

Devices for regulating the tension of a spring that opposes the force of the accumulating grain are not broadly claimed herein, nor devices for transmitting said force through compressing-fingers attached to a rotatable shaft, nor all combinations in which a spring is employed to restore a grain platform or receiver to its normal position; but claim is confined to the combinations particularly hereinafter pointed out.

The mechanism of the automatic clutch operated by the spring-lever $F^3$ is as follows: Upon the main shaft B', which, as before stated, is cut into two parts, is mounted a loose pinion, G, which has upon one of its faces a clutch, $g$. Another clutch, G', is secured to the part of the shaft B' that carries the rakes. Between these two clutches upon the shaft is a sliding clutch-head, $G^2$, with a clutch face at each end to engage either of the clutches, the one upon the loose pinion G, or the one, G', upon the shaft. Upon the middle surface of the sliding clutch-head $G^2$ is a double cam, $g'$, and arranged to engage this cam are two dogs, $G^3$ $G^4$, mounted upon a centrally-pivoted bar, $G^5$, in such manner that when one is pushed forward to engage the cam the other is withdrawn. The dog $G^3$ is connected to the spring-lever or clutch-shipping arm $F^3$, so that when said lever is released from its detaining-hook by the revolution of the receiver, as previously described, the spring will throw it up, and thus set the dog $G^3$ in the path of the cam, so that the further revolution of the clutch-head, acting through its spiral cam upon the said dog, will cause the clutch-head to slide along into engagement with the clutch-face of the loose pinion. This loose pinion meshes with a large gear-wheel, H, upon the shaft $B^2$, which is the shaft that operates all the mechanism except the rakes. Upon this gear-wheel H is a projection, $h$, which, after the wheel has made a complete revolution, strikes against the pivoted bar $G^5$ and reverses the position of the dogs, bringing up the dog $G^4$ into position to engage the cam on the sliding clutch-head and retiring the dog $G^3$, and of course also throwing back the lever $F^3$ attached thereto, far enough for its hook $F^2$ to seize it and hold it until again released by the receiver, as heretofore explained. The dog $G^4$, engaging thus the cam on the sliding clutch-head, throws it back as said head revolves into engagement with the other clutch, releasing the loose pinion and bringing the rakes again into play, while the other parts of the machine are stopped.

The cord-arm J, which is fastened to the rock-shaft $D^2$, is required to have the following movement: It must rise up through the platform and pass around over the bundle to lay the end of the cord into the cord-holder, pausing there long enough to permit the knot to be tied. Then reversing its motion it must go back to its former position under the platform and remain there until called for again by the formation of a new bundle. These motions are all produced through the medium of the rock-shaft $D^2$, to which said cord-arm is rigidly affixed, and are caused as follows: Upon the end of said shaft $D^2$ is a crank, J', connected by a pitman, $J^2$, to a wrist pin or crank, $J^3$, upon the wheel $J^4$, carried by the shaft $B^2$, above alluded to. When the wheel $J^4$ is started to revolve, it will be in the position shown at Fig. 3 of the drawings, and it revolves in the direction of the arrow. Now, it will be understood from said drawings that this motion will give motion to the shaft $D^2$ in the direction of the arrow marked at that shaft in the same figure, which will cause the cord-arm to rise. Upon the wrist-pin $J^3$ is the curved plate J⁵, curved upon an arc having its radius from the center of the wheel J¹.

Upon the end of the pitman J² is a curved plate, J⁶, curved upon an arc having its radius from the wrist-pin on J'. As the wheel J¹ revolves, the crank comes over to the opposite side and the two curved plates are brought into contact, so that the plate J⁶ rides upon the plate J⁵. While thus riding the wrist-pin J³ slides in the slot J⁷ in the pitman, compressing the spring J⁸, producing a pause of the shaft D², lasting until the part of the plate J⁵ on the wheel in contact with the plate J⁶ on the pitman passes below the center, when the shaft D² again commences to move, but now in an opposite direction, owing to the change of centers thus produced. In short, this pause is produced by prolonging the dead-center by means of the riding-plates, and the change of direction of shaft D² is effected by the difference in the radii of the two cranks. It will be understood that the motion of the rock-shaft D² thus produced is sufficient to coil up the spring in the barrel E E' and store the power there required for the purpose hereinbefore explained.

The motion of the tying mechanism is obtained from the wheel J¹, and is properly timed from that wheel, as follows: Upon said wheel, and upon the face opposite to that occupied by the wrist-pin and pitman just described, is a cogged segment, K, occupying a small portion of the rim of the wheel. Engaging this is a pinion, K', upon the shaft K², which communicates by pinions K³ K⁴ with shaft K⁵, which in turn, by pinions K⁶ K⁷, carries the motion to the tying mechanism. The first-mentioned pinion, K', has a hub, k, which is cut away at one side into a bearing-plate or delay-shoe, and the wheel J¹ is provided all around with a rim, k², except at the segment K, where said rim is cut away. Now, it will be seen that the revolution of the wheel J¹ will cause the pinion to revolve only while the segment is passing it, at which time the shoe or bearing-plate of the pinion revolves over the cut-away portion of the rim, and that when the segment has passed, the rim of the wheel J¹ where not cut away will ride upon the cut-away portion of the pinion-hub and hold it positively from further revolution until the segment has come around again; and it will be seen that by the position and length of the cogged segment the motion and pause of the tying mechanism may be determined. Said cogged segment is just long enough to give the pinion, and consequently the tying mechanism, one revolution, and the pause continues the remainder of the revolution of the wheel J¹. The rise of the cord-arm is preceded by the rise of its sheath L, which passes up through the grain on the platform, in order to stop the grain from feeding down onto the cord-arm and to make an opening for the cord-arm. This sheath is provided with a sharp point, to more readily penetrate the straw, and it in general form corresponds to the curved shape of the said cord-arm. It is made in a measure hollow, or as though it were made of angle-iron, as shown in the drawings, the cord-arm lying in the interior of the angle. This sheath is timed to rise just before the cord-arm, and descends just after the cord-arm descends. It is operated from the shaft B² by a cam, L', which consists of a wheel or disk with a quartering-notch cut out from it, into which plays a roller, L², on the end of an arm, L³, on the rock-shaft L⁴, from which rock-shaft projects another arm, L⁵, connected by a pitman, L⁶, to the arm L⁷, projecting from the hub L⁸ of the sheath. Said hub is pivoted loosely on the rock-shaft D². Now, when the shaft B² starts to revolve the cam commences to raise the arm of the rock-shaft L⁴ until it is fully clear of the notch, where it remains until the shaft B² has made nearly a full revolution, when the notch coming around again permits it to descend and become locked until a new movement of said shaft. Of course while the rock-shaft is thus turned the sheath is raised by the connections mentioned. A spring, L⁹, attached to the rock-shaft acts to force the roller down into the notch; but instead of said spring the cam may be made with an exterior rim, so that the action both ways will be positive and produced by the cam.

The binding material used is cord or twine, and I use it in the form of balls, as it comes from the factory, thus dispensing with the trouble and labor of reeling onto reels or spools, and enabling the farmer using the machine to supply himself with binding material at any store where cord or twine in balls is kept. I provide upon the machine at some convenient place a box or receptacle, M, to hold the ball of twine. Adjacent to this is a small hollow frame, M', furnished with a number of pins, M², around or between which the cord from the ball is passed to insure a certain degree of friction, in order that the pull may not too rapidly loosen or unwind the ball. This frame is just below the shaft B². Upon said shaft is a cam, M³, which engages a lever, M⁴, the other end of which rests against a plate, M⁵. The cord from the frame M' is passed through a guide, so as to lie between the end of the lever and plate above mentioned, where it is held firmly by the pressure of the lever against the plate as though in a pair of nippers. From thence the cord is led to the free end of a swing-lever, M⁶, held away from the nipper by a spring, M⁷, and from this lever it passes to a guide, M⁸, and from thence to the cord-arm, and in a groove along the curved back of said arm to an eye in the point.

The operation is as follows: When the cord-arm rises to pass over the bundle, it takes with it the cord, which taking of the cord is permitted by the swing-lever M⁶, which, by its yield, gives cord enough to bind the bundle and tie the knot; but at this time no additional cord is drawn from the ball. Thus I am enabled to regulate perfectly the pull on the cord at the knot-tying mechanism by adjusting the length of the spring on the swing-arm. The knot being tied, the cord-arm at the proper moment returns, and at this moment the cam on the shaft B² comes round to a position where the nipper is released, so that the swing-arm, actuated by its spring, goes back and draws out enough cord from the ball to bind a new bundle, after which the nipper closes and the operation above set forth is repeated. By this arrangement the cord-arm is permitted to go back with a comparatively loose cord, thus relieving practically all strain on the cord-holder at the tying mechanism. A further advantage consists in the fact that the strain on the cord, as it passes around the bundle, is constantly increased from a very slight tension at the start to the full force of the swing-arm spring when the cord is entirely around the bundle.

It may be proper to note here, for the sake of being understood, that the end of the cord is secured in the cord-holder of the tying mechanism, and that the grain is fed upon the cord, which is subsequently carried around the bundle by the cord-arm to nearly the point where it is secured in the cord-holder.

The knot-tying mechanism is in most respects the same as that described by M. L. Gorham in his patent, No. 159,506, for a grain-binder, dated February 9, 1875, in which the two cords—that is to say, the part of the cord held by the cord-holder and the part brought over the bundle by the cord-arm—are laid above a revolving hook, which in turning twists the two into a loop, and a smaller hook below grasps the two cords between the loop and cord-holder, and in the further revolution draws them through the loop, at which moment a knife comes forward and severs the cord between the hook and cord-holder, after which the cord-arm, which has projected beyond the cord-holder, in passing back leaves the end in the cord-holder for a new operation.

The cord-holder wheel N in my machine is made with a groove in the center, into which sets a spring-shoe, $n'$, and a set of belay-pins, $n^2$ $n^2$, are provided at each side of the groove, so that the cord is more securely held. The belay-pins at two sides of the shoe render the insertion of the cord more certain. To further insure the certainty of insertion in the holder of the cord carried back by the cord-arm, I provide on the outside of the wheel N a guide, N′, which guides the cord to its proper place and prevents the loose loop produced by the return of the cord-arm from causing the cord to bend away from the belay-pins. Because of this guide I am enabled to dispense with any take-up mechanisms such as have been employed heretofore to take up the loops.

The wheel N and all the parts of the holder are mounted in a swinging frame, N³, which is pivoted to swing horizontally toward the tying-hook, being kept away from the hook by a spring, N⁴. This yielding of the holder permits the slack for the knot to be taken from the holder instead of from the bundle, and to be taken with greater certainty and with less strain upon the cord and upon the mechanism than if taken from the bundle. This swing of the cord-holder necessitates a peculiar shape to the pawl O, which turns the wheel N, which wheel must rotate in order to belay the cord. I make this pawl in my machine with a long face, so that the swing of the cord-holder does not disengage it therefrom. I take motion for this pawl from the lever O′ and pitman O² from a cam, O³, on the under side of the gear-wheel K⁷, so that each revolution of the tying-hook produces an action of the pawl. A further peculiarity consists in the manner of connecting and the means for holding and adjusting the small hook or needle Q in the tying-hook shaft. This is shown in the sectional Figs. 11 and 11½ of the drawings. The gear-wheel K⁷ is rigidly connected to the tying-hook P, and has an upward extended sleeve or collar provided at its opposite sides with slots $p$, shown in Fig. 11, and slots indicated at $p^2$ in Fig. 11½.

A portion of the body of the tying hook P is cylindrical, as shown at P³, Fig. 11. At the end of its cylindrical portion the body of the tying-hook is provided with a transverse slot extending from P² to P². (Shown in Fig. 11.)

The upper end of the small hook or needle is provided with a screw-thread and is screwed into a correspondingly perforated and threaded nut, Q′. This nut Q′ is preferably made in transverse half-sections, more fully shown in Fig. 11½, and is provided alternately with dowels and sockets for the reception of the dowels, in order that the sections of the nut may be suitably secured to each other and held in their exact relative positions. The two sides of the nut Q′ are provided with transverse longitudinal perforations extending through their bodies, for a purpose hereinafter explained. Below and immediately adjacent to the cam Q³, above mentioned, the tying-hook P is provided with a sleeve, Q², which is provided at two sides with screw-threaded perforations for the reception of set-screws $p'$, having their inner ends reduced in diameter to fit the longitudinal perforations in the nut Q′, and thus made to form shoulders for engaging the sides of the nut and forcing the same against the screw-threaded end of the needle Q. The points of the set-screws $p'$ extend through the perforations of the nut Q′ and engage with the body of the needle Q in a manner to rigidly secure the connection and position of the latter.

By reason of the set-screws $p'$ being connected with the nut on the needle Q through the sleeve Q², the nut and the needle are so fixed to the said sleeve that the parts will move simultaneously. The sleeve Q² is provided with rectangular projections $p^3$, (shown in Fig. 11½,) these projections $p^3$, set in the slots $p^2$ of the sleeve P′, forming an integral part of the gear-wheel K⁷, which is made to form a recess around the body of the tying-hook P. Into this recess is set a spiral spring, which has its tension-base in the bottom of the recess mentioned. This spiral spring acts on the sleeve Q², as will be presently explained.

The gear-wheel K⁷ is put in motion by the pinion K⁶ on the shaft K⁵, and causes the sides of the slots in the sleeve P' to engage with the set-screws p' and projections p³ of the sleeve Q², and thereby produces corresponding rotary motion of the latter. The sleeve Q² is provided at its upper end with a rectangular projection, q², which, as the sleeve is moved in the manner stated, will engage with the cam Q³, and be thereby forced downward, the slots p and p² in the sleeve P' being deep enough to clear the movement of the set-screws p' and projections p³ of the sleeve Q². The nut Q', at the upper end of the needle Q, being fixed to the sleeve Q², as set forth, will slide in the slot P² of the tying-hook P, and the needle Q will thus be given corresponding downward motion with the sleeve Q². When the projection q² of the sleeve Q² passes the projection of the cam Q³, the spring in the sleeve P' will force the sleeve Q² upward.

I claim as new—

1. In a grain-binder, the combination, with the platform and binding mechanism, of a grain-receiver and mechanism, substantially as described, whereby the receiver is made yielding to the pressure of the grain to size the bundle, then fixed to serve as the outer compressor, then again yielding to discharge the bound bundle and to be brought into position to repeat the action, as set forth.

2. In a grain-binder, the combination, with the platform and binding mechanism, of a revolving grain-receiver adapted to yield, a stop to limit the yielding movement, and a tripping device to relieve the stop, whereby said receiver is made yielding to the pressure of the incoming grain up to a determined point to size the bundle, then fixed by the stop to serve as a portion of the compressing mechanism, then yielding again to discharge the bundle and be brought into position to receive and size the next one, substantially as specified.

3. An inclined grain-table, in combination with a rotating bundle-receiver at the lower part of the incline, a vibrating cord-arm which carries the cord around the bundle, and a tying mechanism arranged above the receiver, substantially as and for the purpose set forth.

4. The combination, with the cord-arm, of the intermittingly-vibrating cord-arm sheath and mechanism whereby it is operated to pierce the stream of incoming grain in advance and independently of the cord-arm, to serve as a protection to the cord-arm against entanglement in the straw, to prevent the straw from being carried over into the tying mechanism, and to momentarily stop the flow of grain to the bundle-receptacle while the bundle is being tied, substantially as specified.

5. The rake, the main shaft, the coupling between the main shaft and the rake-operating continuation thereof, the clutch, and a shipper connected with the binding mechanism, all combined and operated substantially as specified, whereby the rake is carried directly by the main shaft and operated only while the other parts are at rest.

6. The yielding cord-holder frame and its wheel, in combination with the long-faced pawl O, substantially as specified, whereby the cord-holder frame may swing to and fro without disengaging the pawl from the wheel.

7. The combination of an inflexible receiver fixed to a shaft adapted to be turned by the pressure of the accumulating grain, a ratchet moving with the receiver, a pawl or trip-lever normally engaging the ratchet, a spring normally holding the pawl or trip-lever in engagement with the ratchet and opposing the movement of the ratchet and receiver, and means for tripping the pawl or lever, all substantially as set forth, whereby the pressure of the grain operates through the shaft of the receiver and the spring-held trip-lever to determine the size of the bundle.

8. The combination of a grain-receiver fixed upon a shaft adapted to be turned by the pressure of the accumulated grain, a clutch-shipping arm and means for actuating it when released from a detaining device, a pawl or lever interposed between the shaft and the clutch-shipping arm and actuated by the turning of the shaft to release the arm, a spring connected to the pawl or lever and acting therethrough to resist the turning of the shaft, and means for altering the tension, whereby the pressure of the grain acts to turn the shaft of the receiver and through the pawl or lever to release the clutch-shipping arm to start the binder.

9. The combination of the yielding receiver, a ratchet moving with the receiver, a pawl or trip-lever normally engaging the ratchet, an adjustable spring normally holding the pawl or trip-lever in engagement with the ratchet and opposing the movement of the ratchet and receiver, and a projection, as F⁵, on revolving shaft B², all as set forth, whereby the receiver is held with a yielding force and subsequently released by the revolution of the shaft.

10. The combination, with a revolving yielding grain-receiver, of a tripping device operated by the yield of the receiver, a spring, and means for adjusting the tension of said spring, whereby the resistance of the receiver is adjusted and the size of the bundle regulated and governed within certain limits, substantially as described.

11. The combination, with the cord-holder wheel, of the actuating-pawl, the knotter-shaft, the bevel-gear carried on said shaft and having a cam, and the connections between said cam and pawl whereby the cord-holder-wheel is operated from the knotter-shaft, substantially as specified.

12. The combination of the cord-arm rock-shaft, the crank on said shaft, a slotted elastically-connected pitman, the crank on the driving-shaft, and the riding-plates on the pitman and driving-crank, substantially as specified, for giving the forward and back movement and pause to the cord-arm.

13. The combination of the receiver D, the barrel E E' on the shaft D², containing a coiled spring, the pawls and ratchets on said barrel, and the pawl-lever F, substantially as specified.

14. The combination of the receiver D, ratchet-disk D³, pawl-lever F, tripping-hook F' F², spring-lever F³, and clutch, substantially as specified.

15. The combination, in a binder, of the lever F³, dogs G³ G⁴, and clutch G' G² g' g, with the trip device and rake-operating shaft to effect the automatic disconnection of the rake, substantially as specified.

16. The combination of the rake-operating shaft, the two clutches g G', and the sliding clutch-head G², the pinion G, wheel H, having stop h, and the dogs G³ G⁴, to automatically stop the rake and start the other parts.

17. The vibrating hollow sheath, in combination with the concentric vibrating cord-arm having an independent movement within said sheath, substantially as specified.

18. The combination of the sheath L, cam L', the rock-shaft operated by said cam, and connections between the rock-shaft and the sheath, substantially as specified.

19. The combination of the shaft B², the cam L', the sheath L, and the connections between the cam and the sheath, substantially as specified.

20. The combination, with the cord-arm, of the independently-reciprocating sheath formed with a longitudinal curve corresponding to the curve of the cord-arm, and also made hollow or of angle material to contain the cord-arm, substantially as specified.

21. The combination, with the intermittingly-rotating bundle holding and discharging device, of a pawl and ratchet, a dog or detent therefor, a power-spring to rotate such bundle holding and discharging device, and means, substantially as described, for automatically releasing the dog or detent and discharging the bundle, substantially as described.

22. In a grain-binder, a grain holding and discharging device connected with a pawl and ratchet and a power-spring to operate it, in combination with a dogging device and mechanism, substantially as described, operated by the binding mechanism to discharge the load and reset the bundler, as set forth.

T. M. FLENNIKEN.

Witnesses:
JOHN W. MUNDAY,
WM. MCGREGOR.